US010133435B2

(12) United States Patent
Bohannon

(10) Patent No.: US 10,133,435 B2
(45) Date of Patent: Nov. 20, 2018

(54) REDUCED CAPACITIVE BASELINE SHIFT VIA SWITCHING ELEMENTS

(71) Applicant: SYNAPTICS INCORPORATED, San Jose, CA (US)

(72) Inventor: Eric Scott Bohannon, Henrietta, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 110 days.

(21) Appl. No.: 15/397,405

(22) Filed: Jan. 3, 2017

(65) Prior Publication Data
US 2018/0188845 A1 Jul. 5, 2018

(51) Int. Cl.
G06F 3/044 (2006.01)
G06F 3/041 (2006.01)

(52) U.S. Cl.
CPC ............ G06F 3/044 (2013.01); G06F 3/0416 (2013.01)

(58) Field of Classification Search
CPC ..................................................... G06F 3/044
See application file for complete search history.

(56) References Cited

U.S. PATENT DOCUMENTS

| 7,031,886 | B1* | 4/2006 | Hargreaves | ........... | G06F 3/0418 |
| | | | | | 375/350 |
| 7,532,202 | B2 | 5/2009 | Roberts | | |
| 7,855,718 | B2 | 12/2010 | Westerman | | |
| 8,026,904 | B2 | 9/2011 | Westerman | | |
| 8,040,321 | B2 | 10/2011 | Peng et al. | | |
| 8,259,086 | B2* | 9/2012 | Agari | ...................... | G06F 3/044 |
| | | | | | 178/18.06 |
| 8,766,949 | B2 | 7/2014 | Schwartz | | |
| 9,244,566 | B2 | 1/2016 | Schwartz et al. | | |
| 9,317,158 | B2 | 4/2016 | Schwartz et al. | | |
| 9,442,598 | B2 | 9/2016 | Shepelev et al. | | |
| 2007/0229468 | A1 | 10/2007 | Peng et al. | | |
| 2007/0262962 | A1 | 11/2007 | XiaoPing et al. | | |
| 2008/0006453 | A1 | 1/2008 | Hotelling | | |
| 2010/0194698 | A1* | 8/2010 | Hotelling | .............. | G06F 1/3218 |
| | | | | | 345/173 |
| 2011/0057670 | A1 | 3/2011 | Jordan | | |

(Continued)

OTHER PUBLICATIONS

International Search Report and Written Opinion Application No. PCT/US2017/066607 dated Apr. 4, 2018, consists of 11 pages.

Primary Examiner — Mihir K Rayan
(74) Attorney, Agent, or Firm — Patterson + Sheridan, LLP

(57) ABSTRACT

A method and related processing system and input device are disclosed, the method comprising driving a first capacitive sensing signal having a predefined first sensing frequency onto a first group of a plurality of sensor electrodes, and acquiring first capacitive measurements of resulting signals received by a second group of the plurality of sensor electrodes. Acquiring first capacitive measurements comprises applying a first demodulation signal having a predefined mixing period defined within a sensing period associated with the first sensing frequency. The method further comprises operating, based on the first demodulation signal, one or more switching elements coupled with one or more sensor electrodes of the first group or the second group, wherein the one or more switching elements are in a conducting state during the mixing period.

20 Claims, 12 Drawing Sheets

(56) References Cited

U.S. PATENT DOCUMENTS

| | | | |
|---|---|---|---|
| 2011/0063993 A1* | 3/2011 | Wilson | G06F 3/044 370/254 |
| 2011/0210939 A1* | 9/2011 | Reynolds | G06F 3/0418 345/174 |
| 2012/0200307 A1 | 8/2012 | Maharyta et al. | |
| 2015/0091848 A1 | 4/2015 | Morein et al. | |
| 2015/0286316 A1 | 10/2015 | Peterson et al. | |
| 2016/0179282 A1 | 6/2016 | Lee | |

* cited by examiner

REDUCED CAPACITIVE BASELINE SHIFT VIA SWITCHING ELEMENTS

BACKGROUND

Field

Embodiments disclosed herein generally relate to electronic devices, and more specifically, techniques for reducing a capacitive baseline shift between different sensing frequencies through operating switching elements coupled with sensor electrodes.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is method comprising driving, onto a first group of a plurality of sensor electrodes, a first capacitive sensing signal having a predefined first sensing frequency, and acquiring, based on the driven first capacitive sensing signal, first capacitive measurements of resulting signals received by a second group of the plurality of sensor electrodes, wherein acquiring first capacitive measurements comprises applying a first demodulation signal having a predefined mixing period defined within a sensing period associated with the first sensing frequency. The method further comprises operating, based on the first demodulation signal, one or more switching elements coupled with one or more sensor electrodes of the first group or the second group, wherein the one or more switching elements are in a conducting state during the mixing period.

Another embodiment described herein is a processing system comprising a sensing module comprising sensing circuitry and configured to drive, onto a first group of a plurality of sensor electrodes, a first capacitive sensing signal having a predefined first sensing frequency, and acquire, based on the driven first capacitive sensing signal, first capacitive measurements of resulting signals received by a second group of the plurality of sensor electrodes, wherein acquiring first capacitive measurements comprises applying a first demodulation signal having a predefined mixing period defined within a sensing period associated with the first sensing frequency. The sensing module is further configured to operate, based on the first demodulation signal, one or more switching elements coupled with one or more sensor electrodes of the first group or the second group, wherein the one or more switching elements are in a conducting state during the mixing period.

Another embodiment described herein is an input device comprising a plurality of sensor electrodes, a plurality of switching elements coupled with the plurality of sensor electrodes, and a processing system. The processing system is configured to drive, onto a first group of the plurality of sensor electrodes, a first capacitive sensing signal having a predefined first sensing frequency, and acquire, based on the driven first capacitive sensing signal, first capacitive measurements of resulting signals received by a second group of the plurality of sensor electrodes, wherein acquiring first capacitive measurements comprises applying a first demodulation signal having a predefined mixing period defined within a sensing period associated with the first sensing frequency. The processing system is further configured to operate, based on the first demodulation signal, one or more switching elements coupled with one or more sensor electrodes of the first group or the second group, wherein the one or more switching elements are in a conducting state during the mixing period.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figure 1:
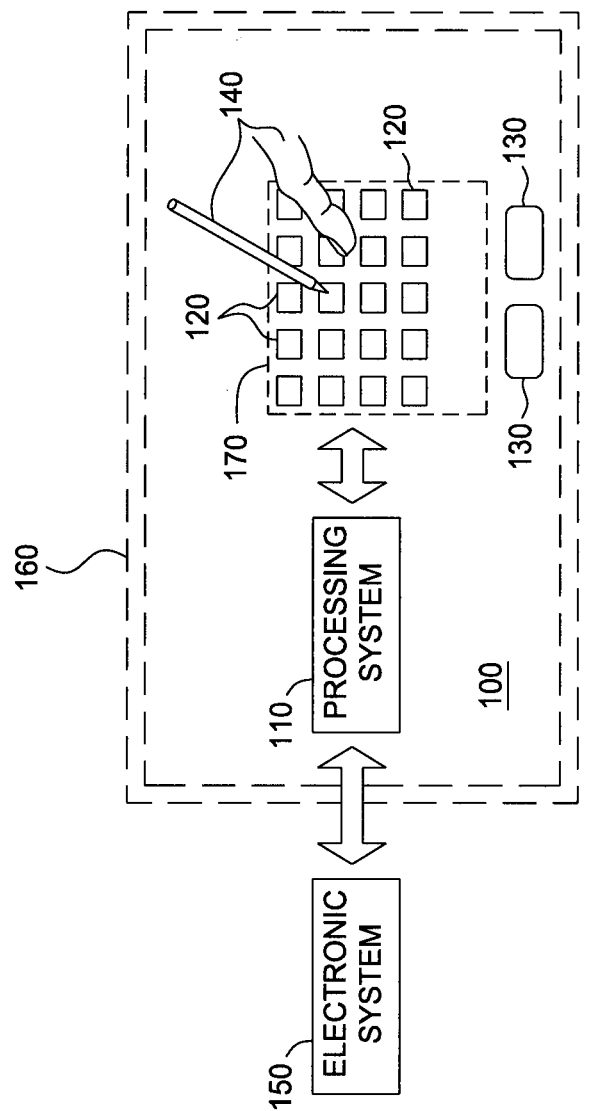
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present technology provide input devices and methods for improving usability. An input device may include electrodes that are operated as sensor electrodes to detect interaction between the input device and an input object (e.g., a stylus or a user's finger).

An input device generally drives a capacitive sensing signal onto sensor electrodes to acquire capacitive measurements. The sensing frequency corresponding to the capacitive sensing signal may be adaptively changed by the input device, e.g., based on detected interference. However, capacitive measurements acquired at different sensing frequencies require some compensation, as the different sensing frequencies generally correspond to different capacitive baselines for the capacitive measurements.

In some embodiments, a same mixing period for a demodulation signal is applied for a plurality of predefined sensing frequencies. Further, the input device operates one or more switching elements to selectively couple sensor electrodes into the sensing path during the predefined mixing period. Because the switching elements are conducting for a fixed amount of time during each sensing half-cycle, charge is conserved on the sensor electrodes and an average input current during a sensing half-cycle remains substantially the same for the different sensing frequencies. Thus, for any transitions between different ones of the predefined sensing frequencies during operation of the input device, the corresponding average current values will have a predictable relationship, which simplifies any correction or compensation that may be needed for the acquired capacitive sensing measurements.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Implementations

Figure 2:
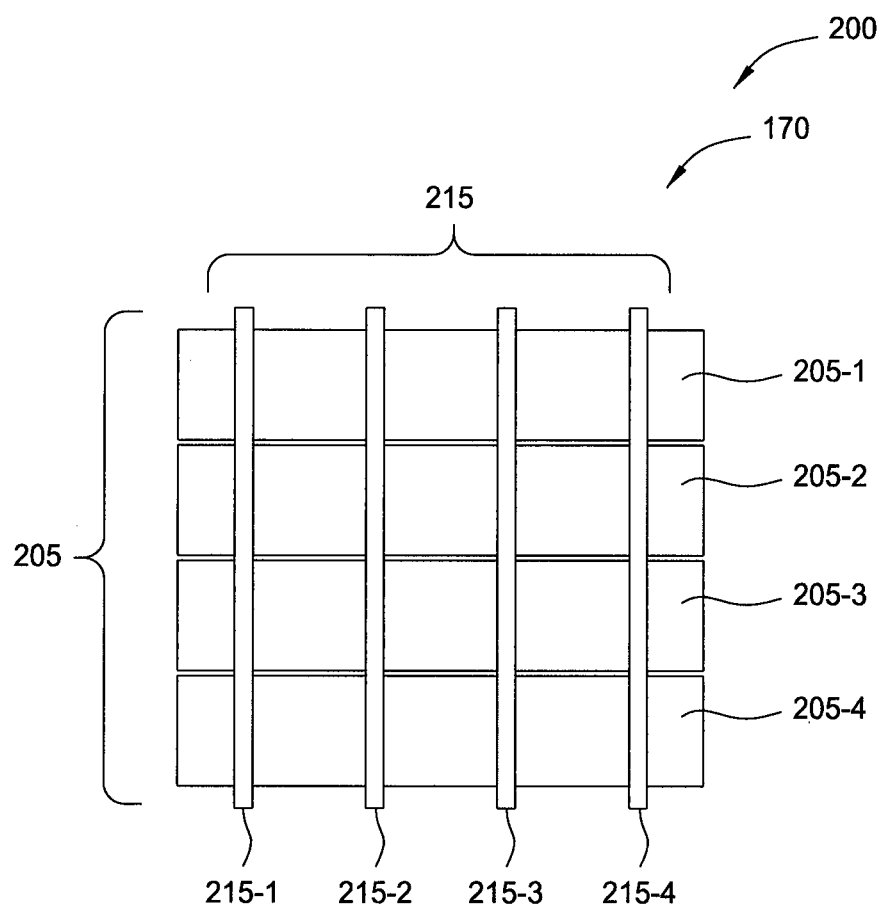
FIGS. 2 and 3 illustrate portions of exemplary sensor electrode implementations, according to embodiments described herein.
Figure 3:
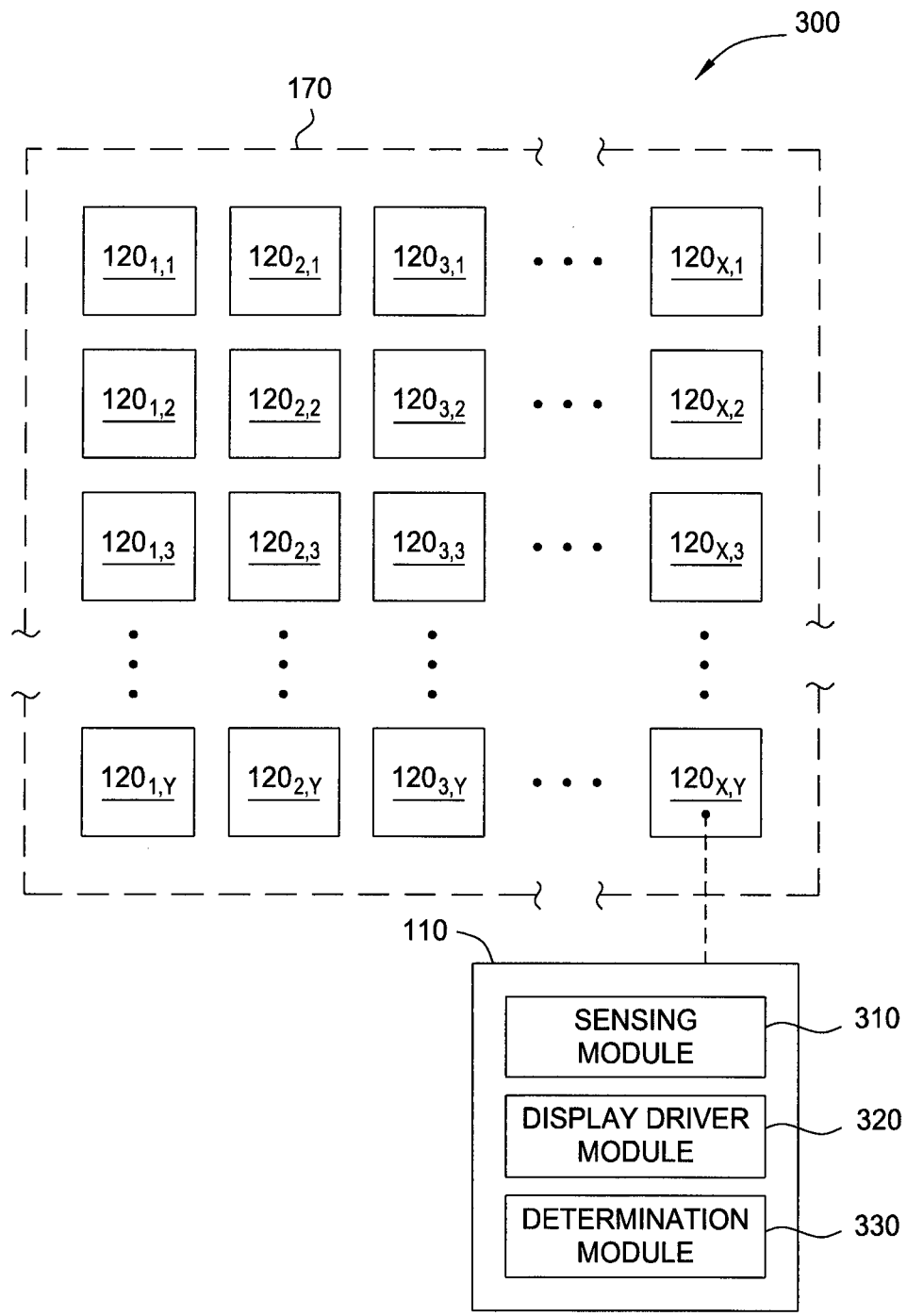

FIGS. 2 and 3 illustrate portions of exemplary sensor electrode implementations, according to embodiments described herein. Specifically, implementation 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other implementations of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Implementation 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable implementation. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the implementation of sensor electrodes 120 ($120_{1,1}, 120_{2,1}, 120_{3,1}, \ldots, 120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the implementation 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}, 120_{2,1}, 120_{3,1}, \ldots, 120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., implementation 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensing module 310 and optionally, a display driver module 320. The sensing module 310 includes circuitry configured to drive at least one of the sensor electrodes 120 for capacitive sensing during periods in which input sensing is desired. In one embodiment, the sensing module 310 is configured to drive a modulated signal onto the at least one sensor electrode 120 to detect changes in absolute capacitance between the at least one sensor electrode and an input object. In another embodiment, the sensing module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensing module 310 may be selectively coupled one or more of the sensor electrodes 120 and/or the grid electrode(s). For example, the sensing module 310 may be coupled selected portions of the sensor electrodes 120 and operate in either an absolute or transcapacitive sensing mode. In another example, the sensing module 310 may be a different portion of the sensor electrodes 120 and operate in either an absolute or transcapacitive sensing mode. In yet another example, the sensing module 310 may be coupled to all the sensor electrodes 120 and operate in either an absolute or transcapacitive sensing mode.

The sensing module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensing module 310 and display driver module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensing module 310 includes circuitry configured to receive resulting signals with the sensor electrodes 120 and/or grid electrode(s) comprising effects corresponding to the modulated signals or the transmitter signals during periods in which input sensing is desired. The sensing module 310 may determine a position of the input object in the sensing region 170 or may provide a signal including information indicative of the resulting signal to another module or processor, for example, a determination module 330 or a processor of an associated electronic device 150 (i.e., a host processor), for determining the position of the input object in the sensing region 170.

The display driver module 320 may be included in or separate from the processing system 110. The display driver module 320 includes circuitry configured to provide display image update information to the display of the display device 160 during non-sensing (e.g., display updating) periods.

In one embodiment, the processing system 110 comprises a first integrated controller comprising the display driver module 320 and at least a portion of the sensing module 310 (i.e., transmitter module and/or receiver module). In another embodiment, the processing system 110 comprises a first integrated controller comprising the display driver module 320 and a second integrated controller comprising the sensing module 310. In yet another embodiment, the processing system comprises a first integrated controller comprising display driver module 320 and a first portion of the sensing module 310 (e.g., one of a transmitter module and a receiver module) and a second integrated controller comprising a second portion of the sensing module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Exemplary Sensing Implementations

Figure 4:
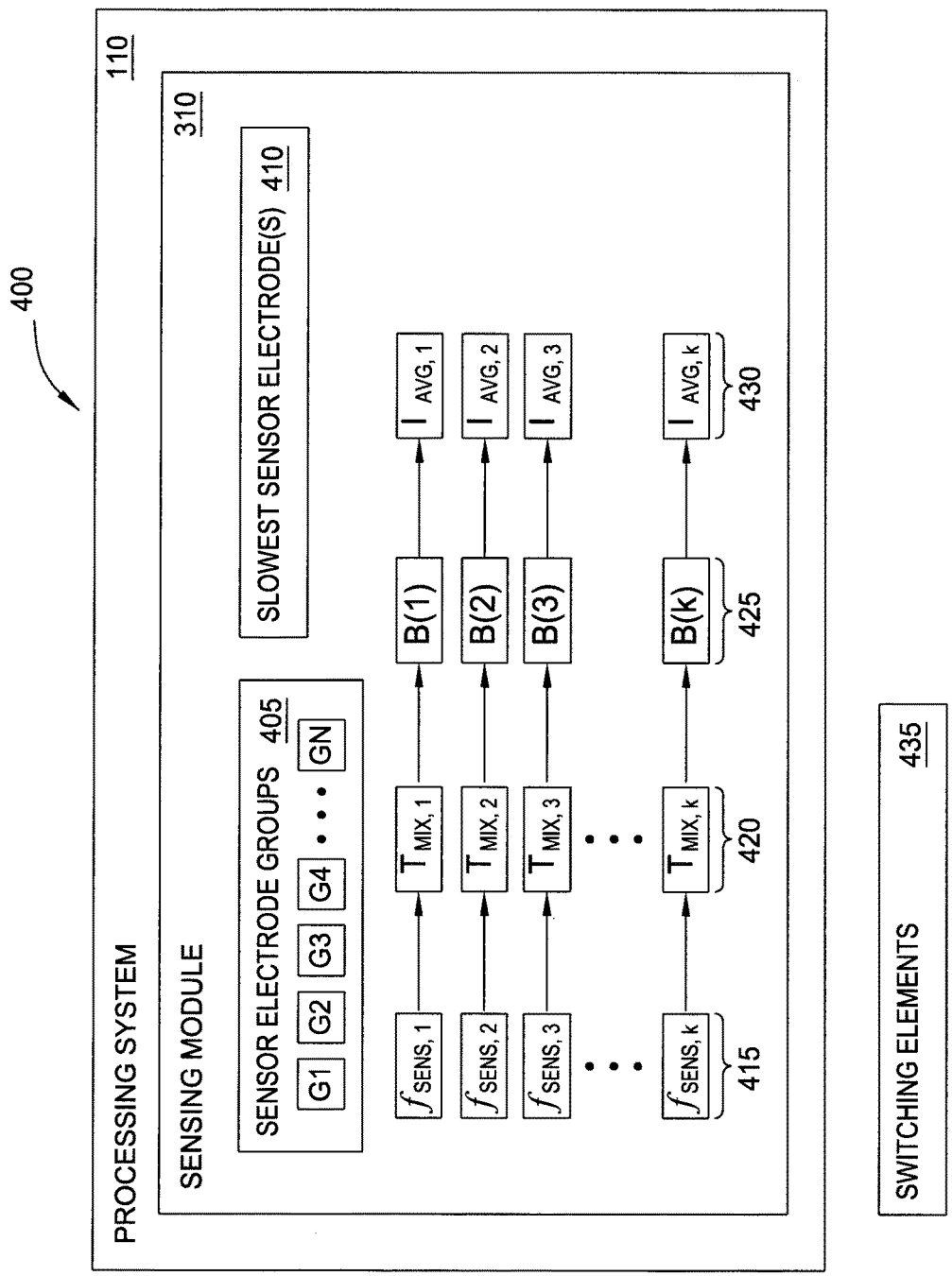
FIG. 4 illustrates an exemplary processing system for applying selected mixing periods for different sensing frequencies, according to embodiments described herein.

FIG. 4 illustrates an exemplary processing system for applying selected mixing periods for different sensing frequencies, according to embodiments described herein. More specifically, implementation 400 provides one possible implementation of the processing system 110 discussed above. Further, the implementation 400 is capable of use in conjunction with various embodiments discussed herein, such as the implementations 200, 300 of sensor electrodes discussed above with respect to FIGS. 2 and 3.

Within implementation 400, the sensing module 310 comprises a plurality of sensor electrode groups 405. Each group G1, G2, G3, G4, GN of the plurality of sensor electrode groups 405 corresponds to at least one sensor electrode of the plurality of sensor electrodes that are coupled with the processing system 110. The processing system 110 operates to perform capacitive sensing by operating selected groups of the groups G1, G2, G3, G4, GN of sensor electrodes to transmit capacitive sensing signals and/or to receive resulting signals. For example, in a transcapacitive sensing implementation, a first group G1 of one or more sensor electrodes is driven with a capacitive sensing signal, and a second group G2 of one or more other sensor electrodes receives resulting signals. In another example, in an absolute capacitive sensing implementation, a particular group G1 of sensor electrodes is driven with a capacitive sensing signal and is also used to receive the resulting signals.

The sensing module 310 further comprises a plurality of predefined sensing frequencies 415. Capacitive sensing signals that are generated by the processing system 110 and subsequently driven onto selected sensor electrodes are generally time-varying signals having a frequency corresponding to a selected one of the sensing frequencies $f_{SENS,1}$, $f_{SENS,2}$, $f_{SENS,3}$, ..., $f_{SENS,K}$. Further, during operation of the processing system 110, the frequency of the generated capacitive sensing signals may be transitioned between selected ones of the sensing frequencies $f_{SENS,1}$, $f_{SEN,S2}$, $f_{SENS,3}$, ..., $f_{SENS,K}$ to avoid interference and thus to improve sensing performance. In some cases, the transition between sensing frequencies $f_{SENS,1}$, $f_{SENS,2}$, $f_{SENS,3}$, ..., $f_{SENS,K}$ is performed responsive to interference measurements performed by the processing system 110.

In some embodiments, the predefined sensing frequencies $f_{SENS,1}$, $f_{SENS,2}$, $f_{SENS,3}$, ..., $f_{SENS,K}$ are selected based on one or more slowest sensor electrodes 410 that are identified within the plurality of sensor electrodes. The one or more slowest sensor electrodes 410 are associated with the relatively longest RC time constants, which causes the one or more slowest sensor electrodes 410 to settle more slowly when driven with various signals (such as the generated capacitive sensing signals). For example, within an input device, the slowest sensor electrodes 410 may generally correspond to those sensor electrodes that are spatially furthest from the processing system 110 and which are connected with the longest and/or most circuitous conductive traces. In such embodiments, the predefined sensing frequencies $f_{SENS,1}$, $f_{SENS,2}$, $f_{SENS,3}$, ..., $f_{SENS,K}$ are selected such that generating capacitive sensing signals with the highest sensing frequency produces acceptable sensing performance even for the slowest sensor electrodes 410.

The sensing module 310 further comprises a plurality of predefined mixing periods 420 (or "mixing window pulse widths") that are used for demodulating resulting signals received by the sensor electrodes (i.e., according to the selected sensor electrode groups G1, G2, ..., GN). Each mixing period $T_{MIX,1}$, $T_{MIX,2}$, $T_{MIX,3}$, ..., $T_{MIX,K}$ of the plurality of predefined mixing periods 420 corresponds to a particular sensing frequency $f_{SENS,1}$, $f_{SENS,2}$, $f_{SENS,3}$, ..., $f_{SENS,K}$.

In some embodiments, the mixing periods $T_{MIX,1}$, $T_{MIX,2}$, $T_{MIX,3}$, ..., $T_{MIX,K}$ are selected such that a plurality of average current values 430 (i.e., average current values $I_{AVG,1}$, $I_{AVG,2}$, $I_{AVG,3}$, ..., $I_{AVG,K}$) corresponding to a plurality of acquired baseline capacitive measurements 425 (i.e., baseline capacitive measurements B(1), B(2), ..., B(K) performed with no input object present) have a predefined relationship with the different sensing frequencies $f_{SENS,1}$, $f_{SENS,2}$, $f_{SENS,3}$, ..., $f_{SENS,K}$. Thus, for any transitions between different ones of the predefined sensing frequencies $f_{SENS,1}$, $f_{SENS,2}$, $f_{SENS,3}$, ..., $f_{SENS,K}$ during operation of the processing system 110, the corresponding average current values $I_{AVG,1}$, $I_{AVG,2}$, $I_{AVG,3}$, ..., $I_{AVG,K}$ will have a predictable relationship, which simplifies any correction or compensation that may be needed (e.g., scaling or shifting) to capacitive sensing measurements. In this way, the processing system 110 avoids the need for calibrating and storing compensation values for each individual sensor electrode or capacitive pixel, which reduces memory requirements and associated cost and size.

In one embodiment, the various mixing periods $T_{MIX,1}$, $T_{MIX,2}$, $T_{MIX,3}$, ..., $T_{MIX,K}$ are selected such that the corresponding average current values $I_{AVG,1}$, $I_{AVG,2}$, $I_{AVG,3}$, ..., $I_{AVG,K}$ are substantially identical. In such a case, the processing system 110 need not perform any correction or compensation to the capacitive sensing measurements when transitioning between different sensing frequencies $f_{SENS,1}$, $f_{SENS,2}$, $f_{SENS,3}$, ..., $f_{SENS,K}$. In another embodiment, the plurality of average current values 430 has a substantially linear relation to the changes to the sensing frequency $f_{SENS,1}$, $f_{SENS,2}$, $f_{SENS,3}$, ..., $f_{SENS,K}$, which requires only a relatively simple correction or compensation by the processing system 110.

In some embodiments, the implementation 400 comprises one or more switching elements 435 coupled with one or more sensor electrodes corresponding to the groups G1, G2, G3, G4, GN of sensor electrodes. The processing system 110 generally operates the switching elements 435 such that the plurality of average current values 430 (i.e., average current values $I_{AVG,1}$, $I_{AVG,2}$, $I_{AVG,3}$, ..., $I_{AVG,K}$) have a predefined relationship with the different sensing frequencies $f_{SENS,1}$, $f_{SENS,2}$, $f_{SENS,3}$, ..., $f_{SENS,K}$. In some embodiments, the switching elements 435 are in a conducting (or "on") state during mixing periods selected from the mixing periods $T_{MIX,1}$, $T_{MIX,2}$, $T_{MIX,3}$, ..., $T_{MIX,K}$, and in a non-conducting (or "off") state during non-mixing periods. In this way, the switching elements 435 couple the associated sensor electrodes within the sensing implementation during the mixing periods, and decouple the sensor electrodes during non-mixing periods. The operation and timing of the switching elements 435 is discussed in greater detail with respect to FIGS. 9, 10, and 11 below. Some non-limiting examples of the one or more switching elements 435 include transistors and multiplexers. Further, although depicted as external to the processing system 110, the switching elements 435 may alternately be included within the processing system 110.

Figure 5:
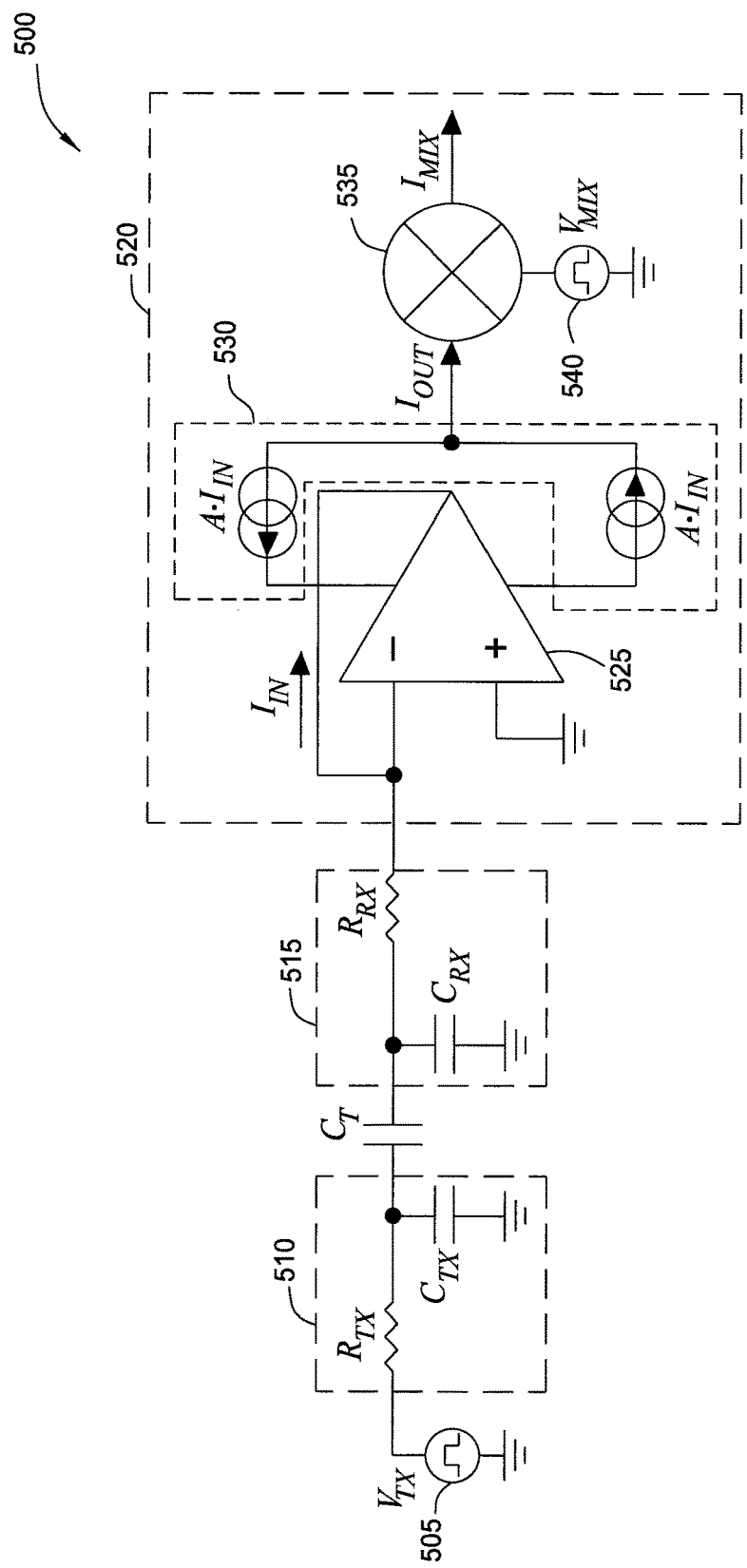
FIG. 5 is a schematic diagram of a sensing implementation for applying selected mixing periods for different sensing frequencies, according to embodiments described herein.

FIG. 5 is a schematic diagram of a sensing implementation 500 (or "implementation") for applying selected mixing periods for different sensing frequencies, according to embodiments described herein. The implementation 500 is capable of use in conjunction with various embodiments discussed herein, such as the implementations 200, 300 of sensor electrodes discussed above with respect to FIGS. 2 and 3 and the processing system depicted in FIG. 4.

The implementation 500 comprises a voltage source 505 that generates a capacitive sensing signal having a voltage waveform $V_{TX}$. The voltage waveform $V_{TX}$ may have any suitable shape, and the frequency of voltage waveform $V_{TX}$ is controlled based on which predefined sensing frequency (e.g., $f_{SENS,1}$, $f_{SENS,2}$, $f_{SENS,3}$, ..., $f_{SENS,K}$ of FIG. 4) is selected. The voltage source 505 drives the capacitive sensing signal onto a sensor electrode 510, which is represented as a first-order model having a transmitter resistance $R_{TX}$ and a transmitter capacitance $C_{TX}$. Based on a transcapacitance $C_T$ between sensor electrode 510 and sensor electrode 515, the sensor electrode 515 receives resulting signals which are provided to receiver circuitry 520. The sensor electrode 515 is also represented as a first-order model having a receiver resistance $R_{RX}$ and a receiver capacitance $C_{Rx}$. However, the principles discussed herein also apply to more complex (e.g., distributed) modeling of the plurality of sensor electrodes. Further, although described in terms of a transcapacitive implementation having two separate sensor electrodes 510, 515, the principles discussed herein also apply to absolute capacitive implementations in which the same sensor electrode(s) are used to transmit and receive capacitive sensing signals.

As shown, the receiver circuitry 520 comprises an amplifier 525 (or "op-amp"), a current conveyor (or "current mirror") 530, and a demodulator (or "mixer") 535. The input current $I_{IN}$ represents the resulting signals received by the sensor electrode 515, and is mirrored by the current conveyor 530 (with any suitable gain value A) as an output current $I_{OUT}$. Based on a received demodulation signal, the demodulator 535 downconverts the output current $I_{OUT}$ having higher (RF) frequencies to a demodulated current $I_{MIX}$, which may be filtered by subsequent circuitry to have approximately direct current (DC) levels (i.e., having substantially no frequency component). As shown, a voltage source 540 generates the demodulation signal with a voltage waveform $V_{MIX}$ that is based on which predefined mixing period (e.g., $T_{MIX,1}$, $T_{MIX,2}$, $T_{MIX,3}$, ..., $T_{MIX,K}$ of FIG. 4) is selected.

The demodulator 535 is generally a continuous-time demodulator having any suitable implementation, such as a square-wave mixer, harmonic rejection mixer, or sinusoidal mixer. Generally, use of a continuous-time demodulator 535 allows a relatively simple hardware implementation of the receiver circuitry 520, while avoiding the need for calibrating and storing compensation values for each individual sensor electrode or capacitive pixel. In some embodiments, the demodulator 535 receives a three-level demodulation signal having a positive level, a negative level, and a zero level.

Figure 6:
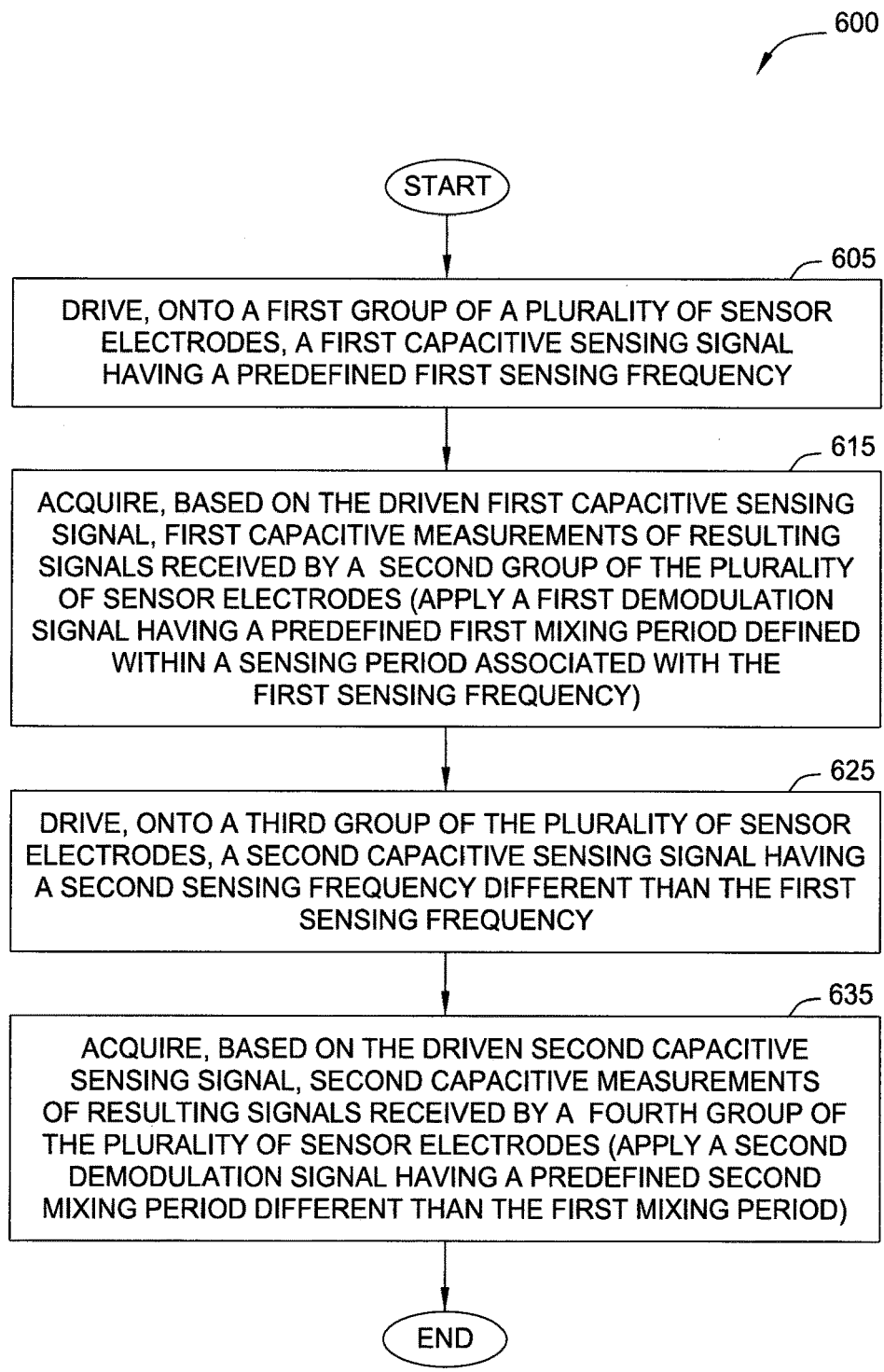
FIG. 6 illustrates a method for applying selected mixing periods for different sensing frequencies, according to embodiments described herein.

FIG. 6 illustrates a method 600 for applying selected mixing periods for different sensing frequencies, according to embodiments described herein. The method 600 is capable of use in conjunction with various embodiments discussed herein, such as the processing system depicted in FIG. 4, or any other suitable processing system.

Method 600 begins at block 605, where the processing system drives, onto a first group of a plurality of sensor electrodes, a first capacitive sensing signal having a predefined first sensing frequency. At block 615, the processing system acquires, based on the driven first capacitive sensing signal, first capacitive measurements of resulting signals received by a second group of the plurality of sensor electrodes. Each of the first group and the second group comprises one or more sensor electrodes. In some absolute capacitive sensing implementations, the first group and the second group are the same. In some transcapacitive sensing implementations, the first group and the second group are different. During block 615, the processing system further applies a first demodulation signal having a predefined first mixing period defined within a sensing period associated with the first sensing frequency.

At block 625, the processing system drives, onto a third group of the plurality of sensor electrodes, a second capacitive sensing signal having a second sensing frequency different than the first sensing frequency. The third group may be the same as the first group, but this is not a requirement. In some cases, the transition between the first sensing frequency and the second sensing frequency is performed responsive to detected interference at the first sensing frequency. At block 635, the processing system acquires, based on the driven second capacitive sensing signal, second capacitive measurements of resulting signals received by a fourth group of the plurality of sensor electrodes. The fourth group may be the same as the second group, but this is not a requirement. During block 635, the processing system further applies a second demodulation signal having a predefined second mixing period different than the first mixing period. In some embodiments, the first and second mixing periods are selected such that a first average current value for a first baseline capacitive measurement at the first sensing frequency has a linear relation with a second average current value for a second baseline capacitive measurement at the second sensing frequency. Method 600 ends following completion of block 635.

Figure 7:
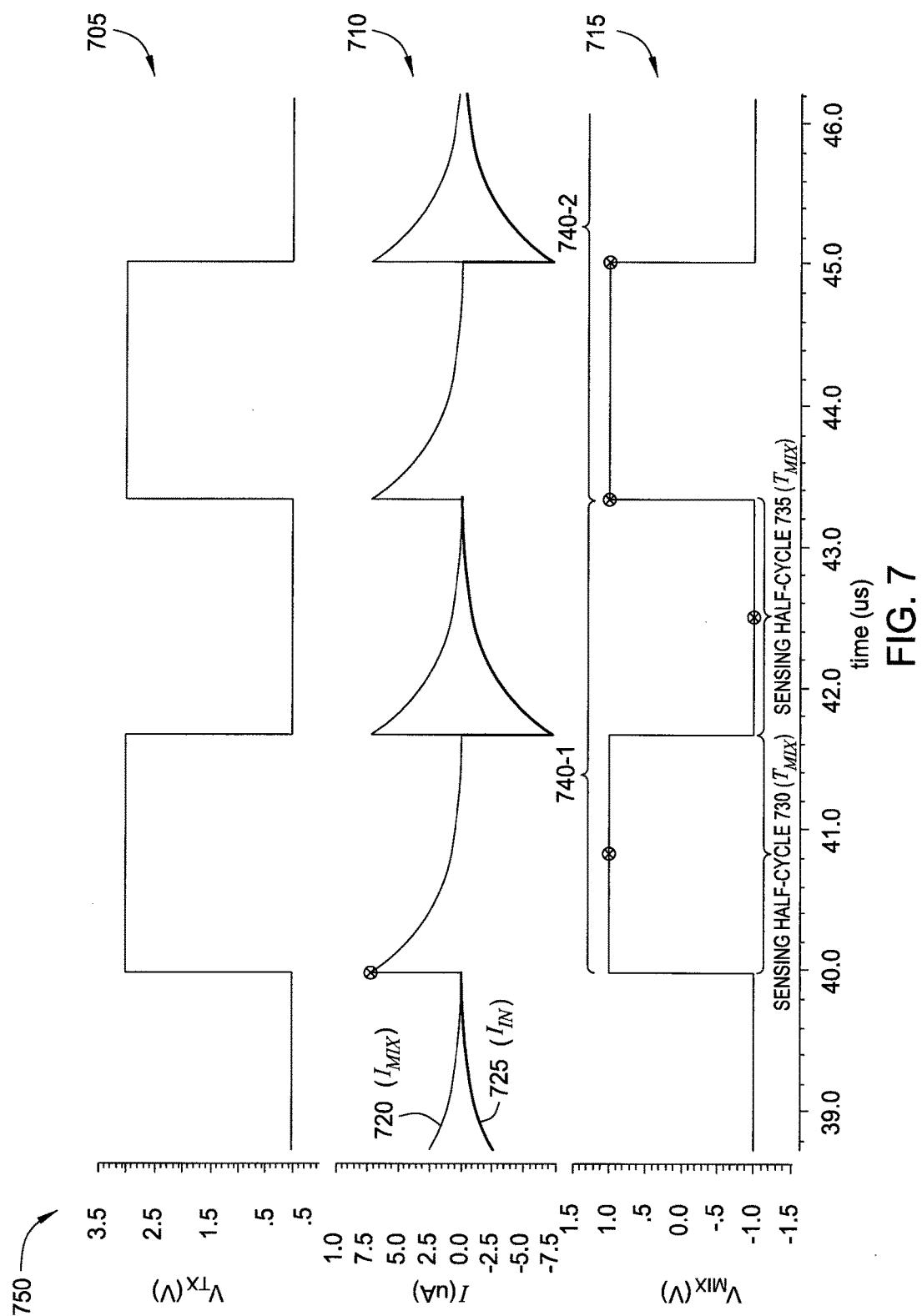
FIG. 7 is a diagram illustrating exemplary operation of a sensing implementation without performing adjustments of the mixing period, according to embodiments described herein.

FIG. 7 is a diagram 700 illustrating exemplary operation of a sensing implementation without performing adjustments of the mixing period, according to embodiments described herein. Generally, the diagram 700 represents operation of the sensing implementation 500 depicted in FIG. 5, or any other suitable processing system.

Diagram 700 includes a plot 705 of voltage waveform $V_{TX}$ in volts (V) over time in microseconds (us). As shown, the voltage waveform $V_{TX}$ is a square wave having a sensing frequency of 300 kilohertz (kHz) and alternating between 3V and 0V levels. Diagram 700 further includes a graph 710, which includes a plot 720 of demodulated current $I_{MIX}$ (i.e., the output current from the demodulator), and a plot 725 of input current $I_{IN}$ (i.e., the input current from received resulting signals). Diagram 700 further includes a plot 715 of voltage waveform $V_{MIX}$, which as shown is a square wave operating at the sensing frequency of 300 kHz and alternating between two levels (i.e., 1V and −1V levels).

Each predefined sensing period forms a plurality of sensing cycles 740-1, 740-2, and so forth. Each sensing cycle 740-1, 740-2 includes a positive sensing half-cycle 730 and a negative sensing half-cycle 735. Each sensing cycle 740-1, 740-2 has a duration of approximately 3.33 us, which corresponds to the 300 kHz sensing frequency. As shown, during the positive sensing half-cycle 730, the demodulator applies the positive level of the demodulation signal (i.e., 1V), and during the negative sensing half-cycle 735, the demodulator applies the negative level of the demodulation signal (i.e., −1V) such that the multiplicative product of the input current $I_{IN}$ and the voltage waveform $V_{MIX}$ produces a signal having a non-zero average value over a single sensing period or an integer number of sensing periods. Within plot 715, the mixing period $T_{MIX}$ equals the length of each sensing half-cycle 730, 735 (here, approximately 1.67 us).

Figure 8:
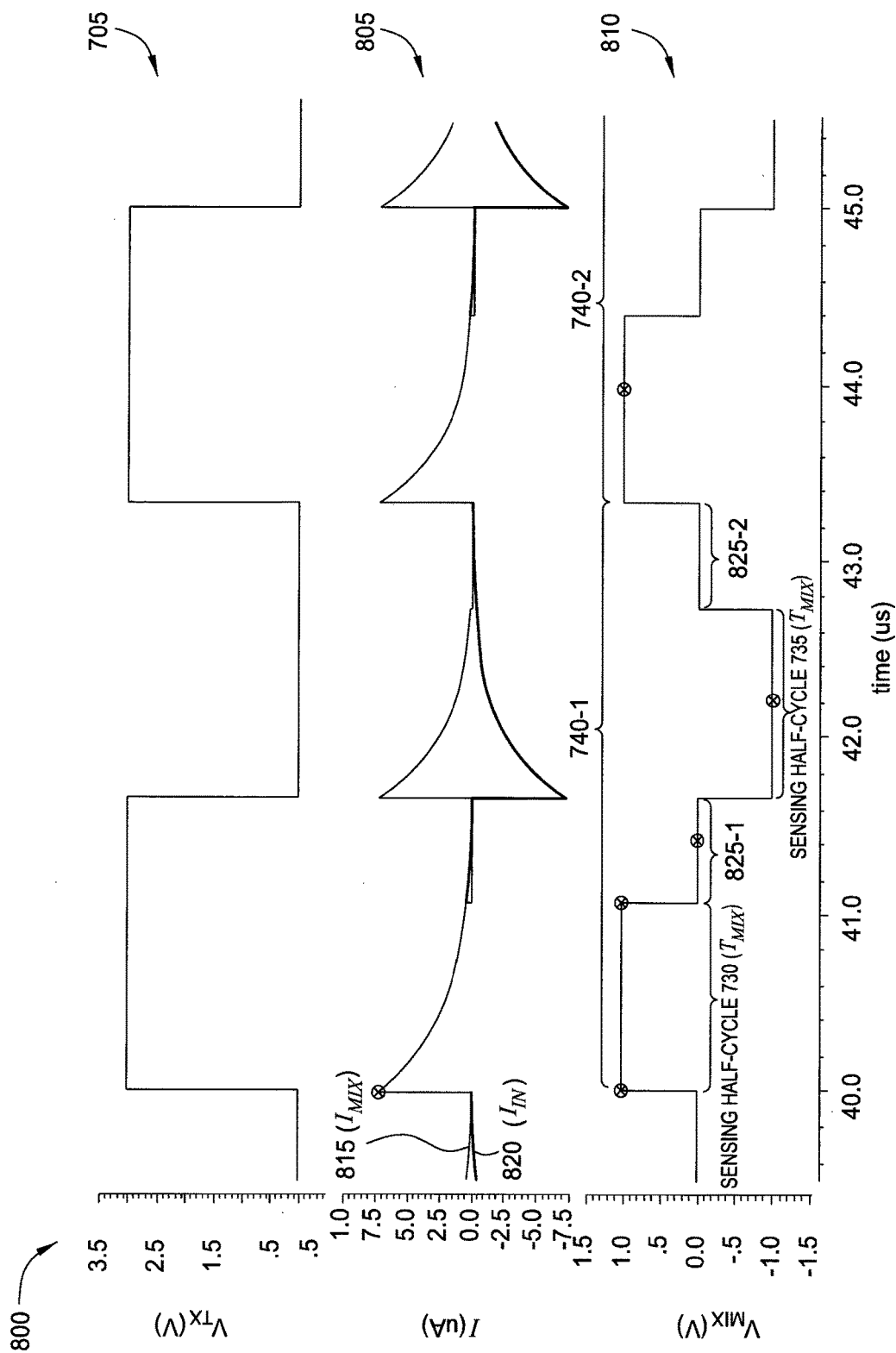
FIG. 8 is a diagram illustrating exemplary operation of a sensing implementation with adjustments performed to the mixing period, according to embodiments described herein.

FIG. 8 is a diagram 800 illustrating exemplary operation of a sensing implementation with adjustments performed to the mixing period, according to embodiments described herein.

Diagram 800 includes the plot 705 of voltage waveform $V_{TX}$, which is a square wave having a sensing frequency of 300 kilohertz (kHz) and alternating between 3V and 0V levels. Each sensing cycle 740-1, 740-2 has a duration of approximately 3.33 us, which corresponds to the 300 kHz sensing frequency. Diagram 800 further includes a graph 805, which includes a plot 815 of demodulated current $I_{MIX}$, and a plot 820 of input current $I_{IN}$. Diagram 800 further includes a plot 810 of voltage waveform $V_{MIX}$, which as shown is a three-level demodulation signal having a positive level (i.e., 1V level), a negative level (i.e., −1V), and a zero level.

Sensing cycle 740-1 comprises a positive sensing half-cycle 730 during which the demodulator applies the positive level of the demodulation signal, a negative sensing half-cycle 735 during which the demodulator applies the negative level of the demodulation signal, and predefined periods 825-1, 825-2 (or non-mixing periods) during which the zero level is applied. Predefined period 825-1 occurs between the positive sensing half-cycle 730 and the negative sensing half-cycle 735, and predefined period 825-2 occurs between the negative sensing half-cycle 735 and a positive sensing half-cycle of the subsequent sensing cycle 740-2. As shown, the mixing period $T_{MIX}$ represents the amount of time during which the demodulation signal is at each of the positive level and the negative level at a given sensing frequency. Within plot 810, the mixing period $T_{MIX}$ is approximately 1.06 us and each predefined period 825-1, 825-2 is approximately 0.60 us.

In some embodiments, the durations of the mixing period $T_{MIX}$ (or sensing half-cycles 730, 735) and the predefined periods 825-1, 825-2 are controlled such that, for baseline capacitive measurements acquired at the different predefined sensing frequencies, the average current values acquired during each sensing half-cycle 730, 735 have a predefined relationship. In one non-limiting example, the average current values may be the same for the different sensing frequencies. In another non-limiting example, the average current values may have a linear relationship based on the difference between the sensing frequencies.

Referring also to the sensing implementation 500 depicted in FIG. 5, and assuming that $R_{TX}=0$ and $C_{TX}=0$, the average current value during a sensing half-cycle can be represented as:

$$I_{MIX} = C_T \cdot V_{TX} \cdot f_{SENS} \cdot \left[\left(1 - e^{\frac{T_{MIX}}{R_{RX} \cdot (C_T + C_{RX})}}\right) \cdot \left(1 + \tanh\frac{1}{4 \cdot f_{SENS} \cdot R_{RX} \cdot (C_T + C_{RX})}\right)\right]. \quad (1)$$

For the case where $T_{MIX}=\frac{1}{2}f_{SENS}$ (such as depicted in FIG. 7), the average current value during a sensing half-cycle can be represented as:

$$I_{MIX} = 2 \cdot C_T \cdot V_{TX} \cdot f_{SENS} \cdot \tanh\frac{1}{4 \cdot f_{SENS} \cdot R_{RX} \cdot (C_T + C_{RX})}, \quad (2)$$

which simplifies to $I_{MIX}=2 \cdot C_T \cdot V_{TX} \cdot f_{SENS}$ (a linear result) as the term ($R_{RX} \cdot (C_T+C_{Rx})$) approaches zero. Thus, the output current $I_{OUT}$ should scale linearly with changes to sensing frequency $f_{SENS}$. The measured capacitance may thus be determined as $$C_T = \frac{I_{OUT}}{2 \cdot V_{TX} \cdot f_{SENS}}.$$

Upon transitioning from a first sensing frequency $f_{SENS,1}$ to a second sensing frequency $f_{SENS,2}$ the ratio of $$\frac{I_{MIX,1}}{I_{MIX,2}}$$

equals the ratio of $$\frac{f_{SENS,1}}{f_{SENS,2}}.$$

In other words, $I_{MIX,1}$ may be linearly scaled by $$\frac{f_{SENS,2}}{f_{SENS,1}}$$

to obtain $I_{MIX,2}$.

As a baseline reference, if $T_{MIX}$ is maintained constant with changes in sensing frequency $f_{SENS}$, the average current value ideally remains constant for each $T_{MIX}$ window. Thus, the performance improvement for the case where a constant $T_{MIX}$ is applied to Equation (1), over the case where $T_{MIX}=\frac{1}{2}f_{SENS}$ shown in Equation (2) can be represented as:

$$\frac{\Delta I_{MIX\ (eq.\ 2)}}{\Delta I_{MIX\ (eq.\ 1)}} = \frac{2}{1-e^{\frac{T_{MIX}}{R_{RX}\cdot(C_T+C_{RX})}}}, \text{ where} \quad (3)$$

$$\Delta I_{MIX} = I_{MIX,1} \cdot \left[\frac{f_{SENS,2}}{f_{SENS,1}}\right] - I_{MIX,2},$$

where ideally $\Delta I_{MIX}=0$. Thus, applying a constant $T_{MIX}$ in Equation (1) provides at least a factor of 2 improvement over the case shown in Equation (2). However, this also indicates that $I_{MIX\ (eq.\ 1)}$ will not remain constant for changes in sensing frequency $f_{SENS}$, as the sensor electrode may not be fully settled causing the initial conditions of the sensor electrode to change with different sensing frequencies $f_{SENS}$.

In some embodiments, different $T_{MIX}$ values are applied for different sensing frequencies $f_{SENS}$. To force $\Delta I_{MIX}=0$, the following relationship must be satisfied:

$$T_{MIX,1} = T_{MIX,2} - 2\cdot R_{RX} \cdot C_{RX} \cdot \ln\left[1+\alpha\cdot\left(1-e^{\frac{T_{MIX,2}}{R_{RX}\cdot(C_T+C_{RX})}}\right)\right], \text{ where} \quad (4)$$

$$1+\alpha = \frac{1+\tanh\left(\frac{1}{4\cdot f_{SENS,2}\cdot R_{RX}\cdot(C_T+C_{RX})}\right)}{1+\tanh\left(\frac{1}{4\cdot f_{SENS,1}\cdot R_{RX}\cdot(C_T+C_{RX})}\right)}. \quad (5)$$

Therefore, a desired linear relationship between $I_{MIX,1}$ and $I_{MIX,2}$ can be achieved by applying different $T_{MIX}$ values for different sensing frequencies $f_{SENS}$. While the analysis provided above is in terms of a single-pole model (i.e., assuming that $R_{TX}=0$ and $C_{TX}=0$), the performance of an exemplary distributed RC model in which different $T_{MIX}$ values are applied for different sensing frequencies $f_{SENS}$ is illustrated further in FIG. 12. Further, in some embodiments a desired gain value A may be applied to the input current $I_{IN}$ (illustrated in plot 820) via the current conveyor.

Figure 9:
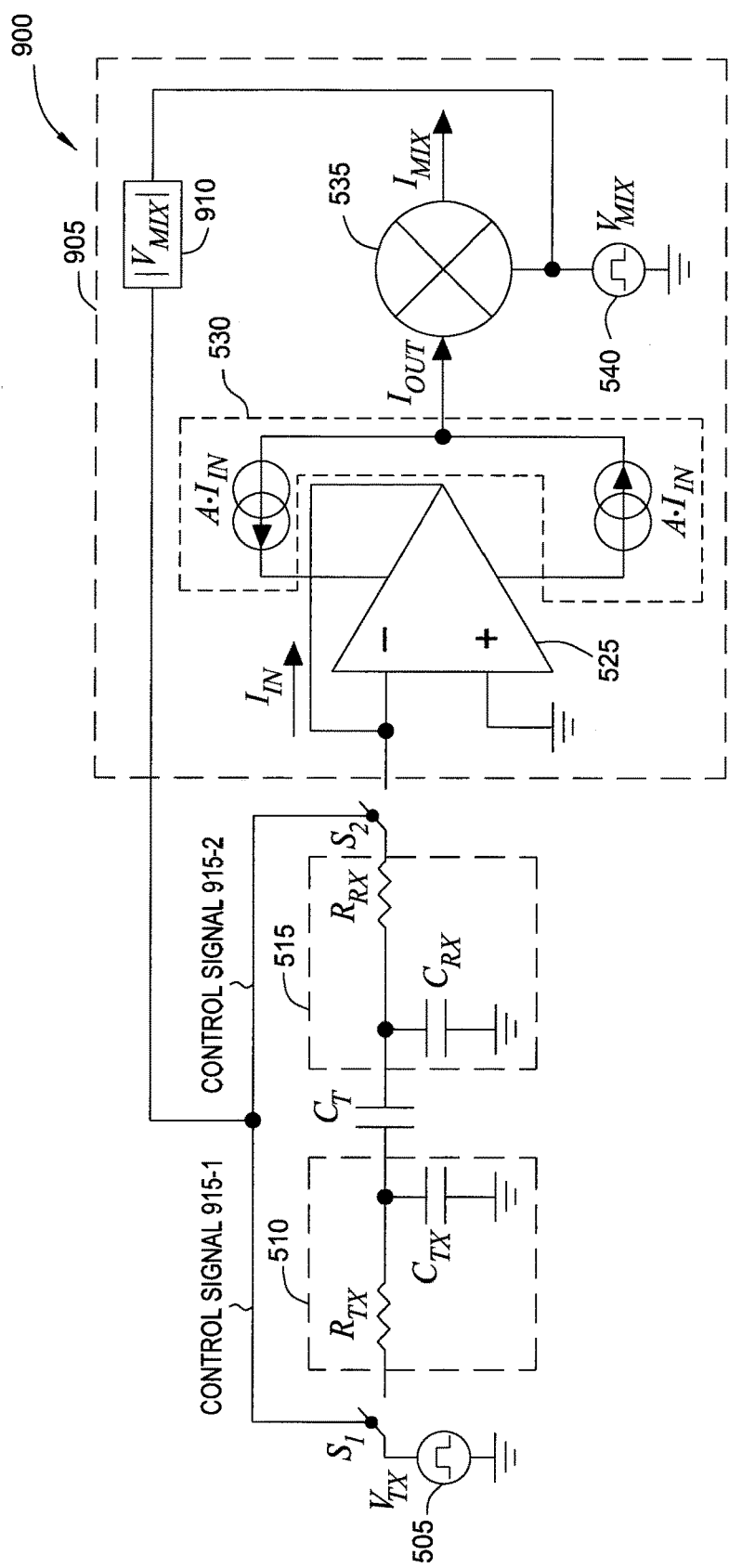
FIG. 9 is a schematic diagram of a sensing implementation for operating one or more switching elements at different sensing frequencies, according to embodiments described herein.

FIG. 9 is a schematic diagram of a sensing implementation 900 (or "implementation") for operating one or more switching elements at different sensing frequencies, according to embodiments described herein. The implementation 900 is capable of use in conjunction with various embodiments discussed herein, such as the implementations 200, 300 of sensor electrodes discussed above with respect to FIGS. 2 and 3 and the processing system depicted in FIG. 4.

The implementation 900 comprises the voltage source 505 that generates a capacitive sensing signal having a voltage waveform $V_{TX}$. The voltage waveform $V_{TX}$ may have any suitable shape, and the frequency of voltage waveform $V_{TX}$ is controlled based on which predefined sensing frequency (e.g., $f_{SENS,1}$, $f_{SENS,2}$, $f_{SENS,3}$, . . . , $f_{SENS,K}$ of FIG. 4) is selected. The voltage source 505 drives the capacitive sensing signal onto a sensor electrode 510, which is represented as a first-order model having a transmitter resistance $R_{TX}$ and a transmitter capacitance $C_{TX}$. Based on a transcapacitance $C_T$ between sensor electrode 510 and sensor electrode 515, the sensor electrode 515 receives resulting signals which are provided to receiver circuitry 905. The sensor electrode 515 is also represented as a first-order model having a receiver resistance $R_{RX}$ and a receiver capacitance $C_{Rx}$. However, the principles discussed herein also apply to more complex (e.g., distributed) modeling of the plurality of sensor electrodes. Further, although described in terms of a transcapacitive implementation having two separate sensor electrodes 510, 515, the principles discussed herein also apply to absolute capacitive implementations in which the same sensor electrode(s) are used to transmit and receive capacitive sensing signals.

As shown, the receiver circuitry 905 comprises the amplifier 525 (or "op-amp"), the current conveyor (or "current mirror") 530, and the demodulator (or "mixer") 535. The input current $I_{IN}$ represents the resulting signals received by the sensor electrode 515, and is mirrored by the current conveyor 530 (with any suitable gain value A) as an output current $I_{OUT}$. Based on a received demodulation signal, the demodulator 535 downconverts the output current $I_{OUT}$ having higher (RF) frequencies to a demodulated current $I_{MIX}$, which may be filtered by subsequent circuitry to have approximately direct current (DC) levels (i.e., having substantially no frequency component). As shown, a voltage source 540 generates the demodulation signal with a voltage waveform $V_{MIX}$ that is based on a selected mixing period (e.g., $T_{MIX,1}$, $T_{MIX,2}$, $T_{MIX,3}$, . . . , $T_{MIX,K}$ of FIG. 4).

The demodulator 535 is generally a continuous-time demodulator having any suitable implementation, such as a square-wave mixer, harmonic rejection mixer, or sinusoidal mixer In some embodiments, the demodulator 535 receives a three-level demodulation signal having a positive level, a negative level, and a zero level.

In implementation 900, a first switching element $S_1$ is configured to selectively couple the voltage source 505 and the sensor electrode 510, and a second switching element S2 is configured to selectively couple the sensor electrode 515 and the receiver circuitry 905. The first switching element S1 is controlled by a control signal 915-1, and the second switching element S2 is controlled by a control signal 915-2. In some embodiments, a calculation block 910 outputs a magnitude of the voltage waveform $V_{MIX}$ as the control signals 915-1, 915-2. Thus, in the case of a three-level demodulation signal, each of the positive level and the negative level corresponds to a conducting state of the switching elements S1 and S2, and the zero level corresponds to a non-conducting state of the switching elements S1 and S2. In this way, the receiver circuitry 905 operates the switching elements S1, S2 to selectively couple the respective sensor electrodes 510, 515 into the sensing path beginning from the voltage source 505 and ending at the input to the receiver circuitry 905. Beneficially, the switching elements S1 and S2 may be implemented within the digital domain without requiring relatively larger analog hardware.

In some embodiments, the switching elements S1, S2 couple the respective sensor electrodes 510, 515 into the sensing path only during mixing periods of a sensing period, defined by a selected mixing period $T_{MIX}$. In such embodiments, the value of mixing period $T_{MIX}$ is constant for different sensing frequencies $f_{SENS}$. Because switching elements S1, S2 are closed (conducting) for a fixed amount of time (i.e., the mixing period $T_{MIX}$) during each sensing half-cycle, charge is conserved on the sensor electrodes and the amount of input current $I_{IN}$ substantially remains the same across the different sensing frequencies $f_{SENS}$. Assuming that $R_{TX}=0$ and $C_{TX}=0$, the average current value during a sensing half-cycle can be represented as:

$$I_{MIX} = \frac{C_T\cdot V_{TX}}{T_{MIX}} \cdot \left[1+e^{\frac{T_{MIX}}{R_{RX}\cdot(C_T+C_{RX})}}\cdot\left(e^{\frac{T_{MIX}}{R_{RX}\cdot(C_T+C_{RX})}}-1\right)\right] \cdot \quad (6)$$

$$\left(1+e^{\frac{T_{MIX}}{R_{RX}\cdot(C_T+C_{RX})}}\right),$$

illustrating that to a first order, the average current value of $I_{MIX}$ will be independent of the sensing frequency $f_{SENS}$.

While two switching elements S1, S2 are depicted in implementation 900, alternate implementations may include a single switching element within the sensing path. Further, while single sensor electrodes 510, 515 are shown as coupled with respective switching elements S1, S2, alternate implementations may have multiple sensor electrodes (e.g., a plurality of sensor electrodes within a predefined group) coupled with a single switching element.

In some embodiments, the number and location of the one or more switching elements are selected based on the time constants of the associated sensor electrodes 510, 515. As is known to the person of ordinary skill in the art, the time constant associated with a particular sensor electrode depends upon both the sensor electrode resistance and the sensor electrode capacitance. For example, the time constant associated with sensor electrode 510 depends on the values of $R_{TX}$ and $C_{TX}$. For the case in which the time constant associated with the sensor electrode 510 is dominant (i.e., significantly larger) than that of the sensor electrode 515, the implementation 900 operates switching element S1 while maintaining an electrical connection between the sensor electrode 515 and the input to the receiver circuitry 905. In some implementations, the switching element S2 is omitted from the implementation 900 and replaced by a direct electrical connection. In other implementations, the control signals 915-1, 915-2 are independent and the control signal 915-2 causes the switching element S2 to remain in a conducting state to form the electrical connection.

Similarly, in the case in which the time constant associated with the sensor electrode 515 is dominant, the implementation 900 may operate switching element S1 independently of switching element S2 to maintain an electrical connection between the voltage source 505 and the sensor electrode 510l or may omit switching element S1 entirely. In the case in which neither time constant is dominant (e.g., the time constants are on the same order), both switching elements S1, S2 are included in the implementation 900 and may be operated using a same control signal for control signals 915-1, 915-2.

Figure 10:
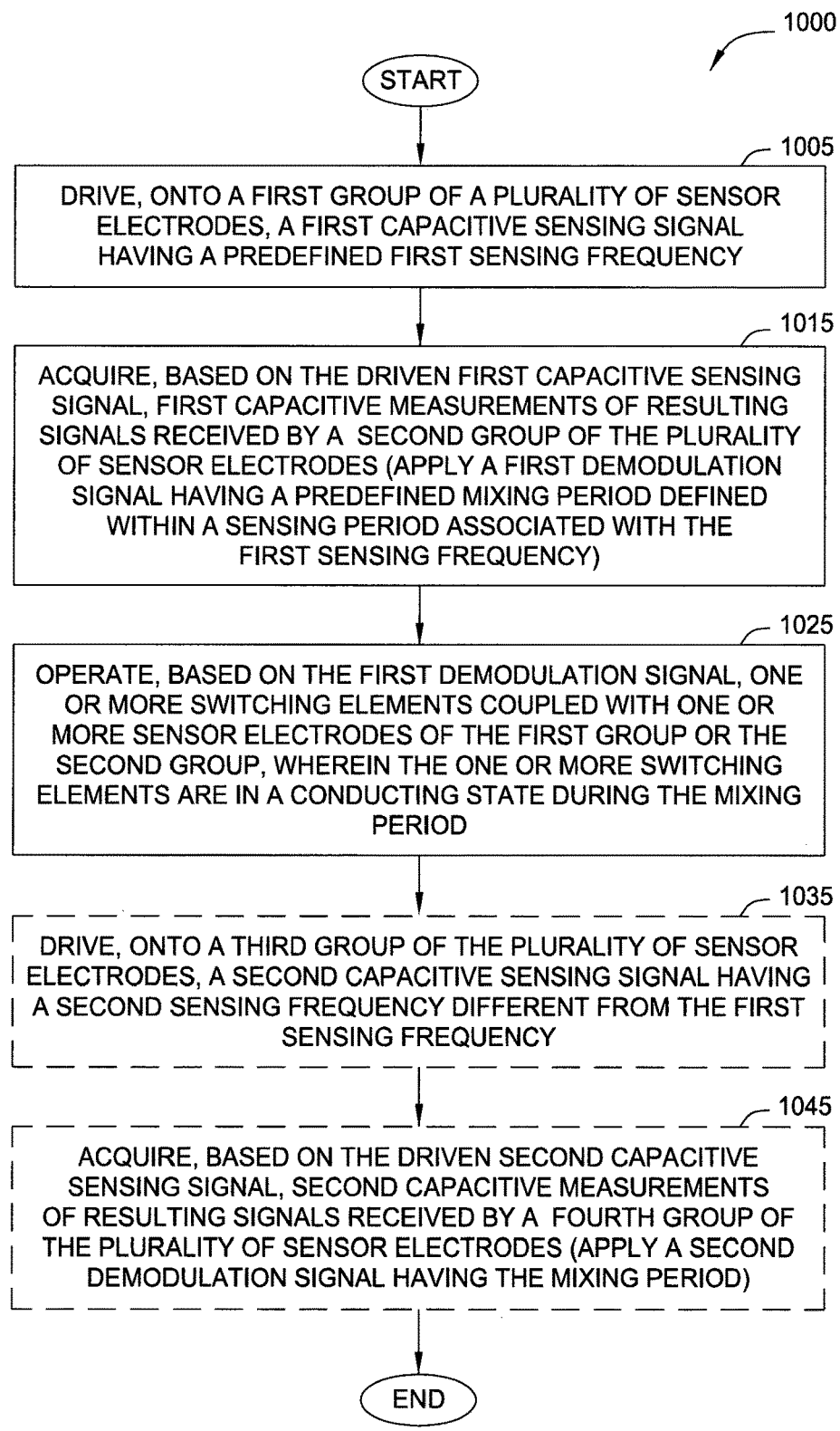
FIG. 10 illustrates a method for operating one or more switching elements at different sensing frequencies, according to embodiments described herein.

FIG. 10 illustrates a method 1000 for operating one or more switching elements at different sensing frequencies, according to embodiments described herein. The method 1000 is capable of use in conjunction with various embodiments discussed herein, such as the processing system depicted in FIG. 4 and the sensing implementation 900 of FIG. 9, or any other suitable processing system.

Method 1000 begins at block 1005, where the processing system drives onto a first group of a plurality of sensor electrodes, a first capacitive sensing signal having a predefined first sensing frequency. At block 1015 the processing system acquires, based on the driven first capacitive sensing signal, first capacitive measurements of resulting signals received by a second group of the plurality of sensor electrodes. The processing system applies a first demodulation signal having a predefined mixing period defined within a sensing period associated with the first sensing frequency. In some embodiments, the predefined first sensing frequency is selected based on one or more identified slowest sensor electrodes. In some cases, the predefined first sensing frequency is one of a plurality of predefined sensing frequencies, and the predefined mixing period is selected to fit within sensing half-cycles of the greatest (i.e., highest frequency) of the predefined sensing frequencies.

At block 1025, the processing system operates, based on the first demodulation signal, one or more switching elements coupled with one or more sensor electrodes of the first group or the second group, wherein the one or more switching elements are in a conducting state during the mixing period. In this way, the processing system operates the one or more switching elements to selectively couple the respective sensor electrodes into the sensing path.

At optional block 1035, the processing system drives, onto a third group of the plurality of sensor electrodes, a second capacitive sensing signal having a second sensing frequency different from the first sensing frequency. The third group may be the same as the first group, but this is not a requirement. In some cases, the transition between the first sensing frequency and the second sensing frequency is performed responsive to detected interference at the first sensing frequency.

At optional block 1045, the processing system acquires, based on the driven second capacitive sensing signal, second capacitive measurements of resulting signals received by a fourth group of the plurality of sensor electrodes. The fourth group may be the same as the second group, but this is not a requirement. The processing system applies a second demodulation signal having the mixing period. Because the one or more switching elements are in a conducting state for a fixed amount of time (i.e., the predefined mixing period) during each sensing half-cycle, the average current value for input current to receiver circuitry of the processing system remains substantially the same for the first sensing frequency and the second sensing frequency. Method 1000 ends following completion of block 1045.

Figure 11:
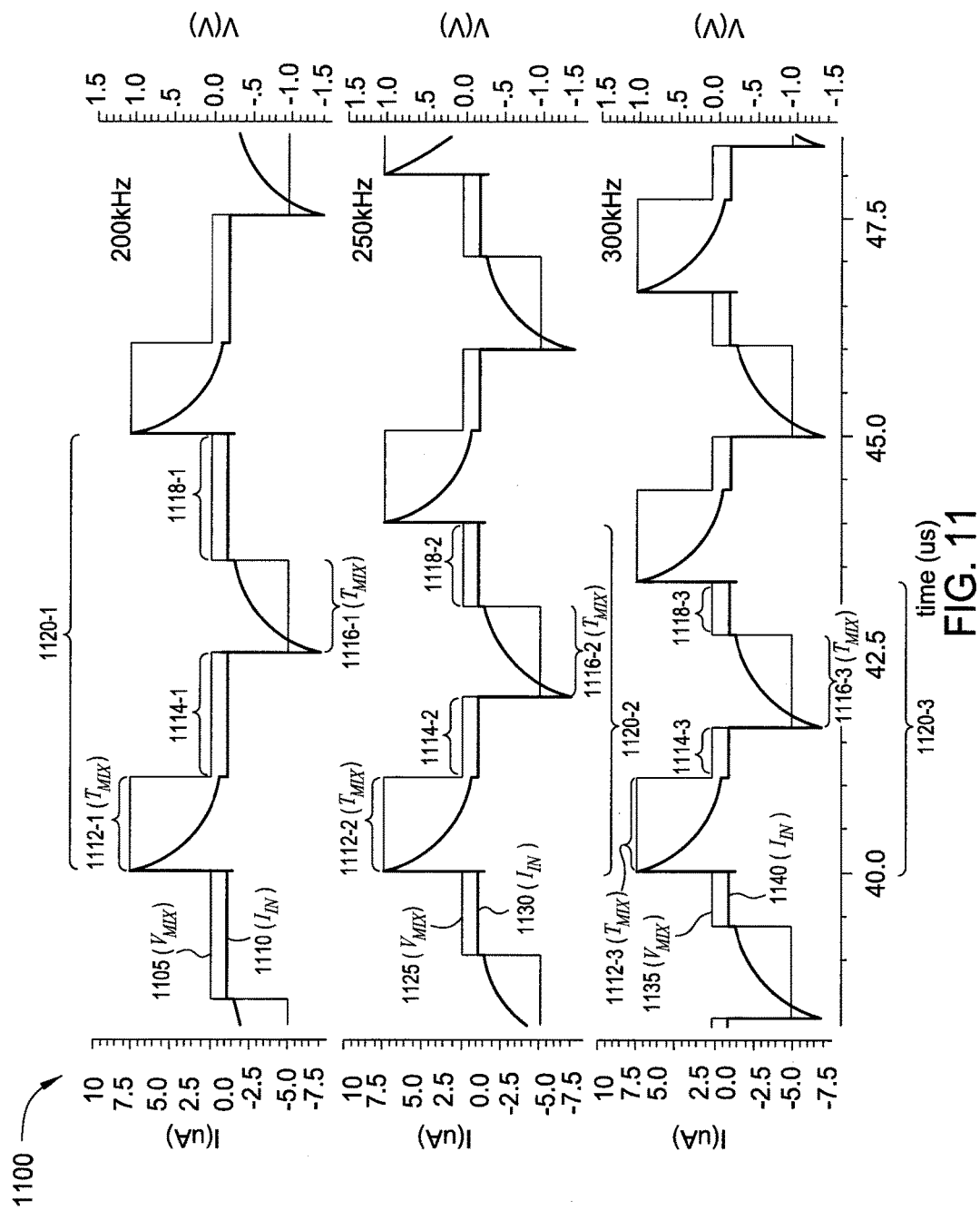
FIG. 11 is a diagram illustrating exemplary operation of a sensing implementation using one or more switching elements, according to embodiments described herein.

FIG. 11 is a diagram 1100 illustrating exemplary operation of a sensing implementation using one or more switching elements, according to embodiments described herein. More specifically, diagram 1100 illustrates exemplary operation of the sensing implementation 900 of FIG. 9, or any other suitable sensing implementation.

Diagram 1100 includes a plot 1105 depicting a three-level demodulation signal ($V_{MIX}$) corresponding to a sensing frequency of 200 kHz. Plot 1110 depicts an input current $I_{IN}$ resulting from driving one or more sensor electrodes at the 200 kHz sensing frequency. Within a sensing cycle 1120-1, the positive level (i.e., 1V) of the demodulation signal is applied during a positive sensing half-cycle 1112-1, and the negative level (i.e., −1V) of the demodulation signal is applied during a negative sensing half-cycle 1116-1. Each of the positive sensing half-cycle 1112-1 and the negative sensing half-cycle 1116-1 correspond to a predefined mixing period $T_{MIX}$. The sensing cycle 1120-1 also includes predefined periods 1114-1, 1118-1 (or "non-mixing periods"), during which the zero level of the demodulation signal is applied. As shown, the predefined periods 1114-1, 1118-1 have a substantially equal length, but this is not a requirement. According to embodiments discussed herein, switching element(s) that are coupled with the sensor electrode(s) are in a conducting state during each mixing period $T_{MIX}$, and are in a non-conducting state during each non-mixing period 1114-1, 1118-1.

Plot 1125 depicts the three-level demodulation signal $V_{MIX}$ corresponding to a sensing frequency of 250 kHz, and plot 1130 depicts the corresponding input current $I_{IN}$ at the sensing frequency. Similarly, plot 1135 depicts the three-level demodulation signal $V_{MIX}$ corresponding to a sensing frequency of 300 kHz, and plot 1140 depicts the corresponding input current $I_{IN}$. Within each of the sensing cycles 1120-2 (250 kHz), 1120-3 (300 kHz), the positive sensing half-cycles 1112-2, 1112-3 and negative sensing half-cycles 1116-2, 1116-3 each correspond to the predefined mixing period $T_{MIX}$, while the predefined periods 1114-2, 1118-2, 1114-3, 1118-3 are shortened as sensing frequency increases. Because the switching element(s) are in a conducting state for a fixed amount of time (i.e., the predefined mixing period $T_{MIX}$) during each sensing half-cycle, the average current value for the input current $I_N$ remains substantially the same across the different sensing frequencies. And because the average current value is controlled to be substantially the same for different sensing frequencies, any shift occurring in the capacitive baseline when transitioning between different sensing frequencies is partly or fully mitigated.

Figure 12:
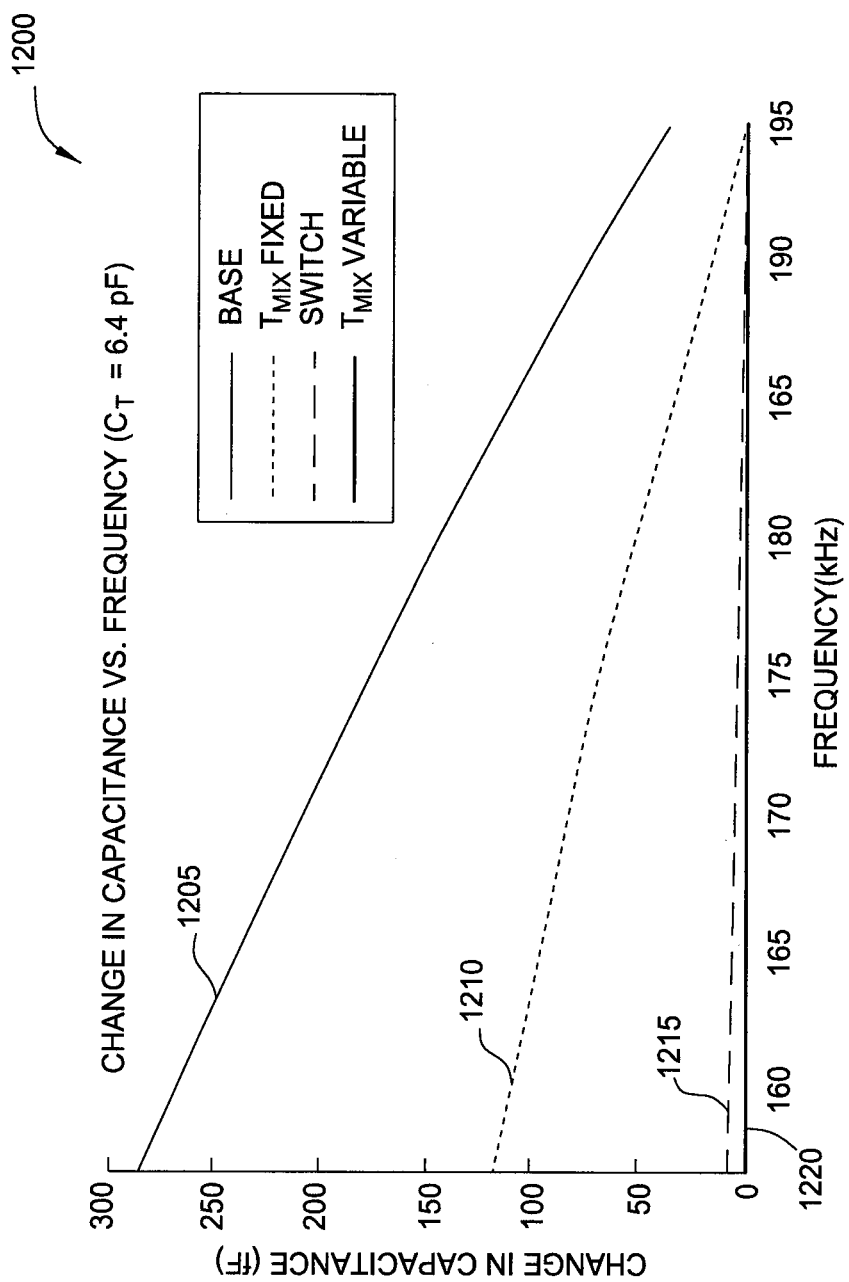
FIG. 12 is a graph illustrating changes in capacitance across different sensing frequencies, according to embodiments described herein.

FIG. 12 is a graph 1200 illustrating changes in capacitance across different sensing frequencies, according to embodiments described herein. More specifically, graph 1200 illustrates simulation results for a distributed RC model of the plurality of sensor electrodes, and corresponding to a transcapacitance $C_T$ of 6.4 picofarads (pF). Within graph 1200, a plot 1205 represents a case in which the predefined mixing period equals half of the period corresponding to the particular sensing frequency (similar to FIG. 7). Plot 1205 illustrates a substantially linear change in baseline capacitance over the depicted range of sensing frequencies (160 kHz to 195 kHz), which will be compensated by the processing system when transitioning between different sensing frequencies.

Plot 1210 represents an implementation having a constant mixing period applied across the range of sensing frequencies. As shown, and consistent with the discussion of Equation (3) above, applying a constant mixing period offers at least a factor of 2 improvement (i.e., reduction or mitigation) of the baseline capacitance shift, when compared with plot 1205. Plot 1215 represents an implementation having switching elements selectively coupling sensor electrodes during mixing periods (such as implementation 900 of FIG. 9), which provides an additional reduction or mitigation of the baseline capacitance shift. Plot 1220 represents an implementation having a variable mixing period that depends on the selected sensing frequency (similar to FIG. 8). A maximum value of the plot 1220 is approximately 5 femtofarads (fF), offering an additional reduction or mitigation of the baseline capacitance shift.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A method comprising:
   driving, onto a first group of a plurality of sensor electrodes, a first capacitive sensing signal having a predefined first sensing frequency;
   acquiring, based on the driven first capacitive sensing signal, first baseline capacitive measurements of resulting signals received by a second group of the plurality of sensor electrodes, wherein acquiring first baseline capacitive measurements comprises applying a first demodulation signal having a predefined mixing period defined within a sensing period associated with the first sensing frequency; and
   operating, based on the first demodulation signal, one or more switching elements coupled with one or more sensor electrodes of the first group or the second group, wherein the one or more switching elements are in a conducting state during the mixing period.

2. The method of claim 1, further comprising:
   driving, onto a third group of the plurality of sensor electrodes, a second capacitive sensing signal having a second sensing frequency different from the first sensing frequency; and
   acquiring, based on the driven second capacitive sensing signal, second baseline capacitive measurements of resulting signals received by a fourth group of the plurality of sensor electrodes, wherein acquiring second baseline capacitive measurements comprises applying a second demodulation signal having the mixing period,
   wherein a first average current value for the first baseline capacitive measurements is substantially equal to a second average current value for the second baseline capacitive measurements.

3. The method of claim 1, wherein each sensing period comprises a positive sensing half-cycle and a negative sensing half-cycle, wherein the positive sensing half-cycle and the negative sensing half-cycle each have a length corresponding to the mixing period.

4. The method of claim 3, wherein the first demodulation signal is a three-level demodulation signal having a positive level, a negative level, and a zero level, and
   wherein applying the first demodulation signal and applying the second demodulation signal each comprises:
      applying the positive level during the positive sensing half-cycle;
      applying the negative level during the negative sensing half-cycle; and
      applying the zero level during a predefined period within the sensing period between the positive sensing half-cycle and the negative sensing half-cycle.

5. The method of claim 1, wherein a number and a location of the one or more switching elements are selected based on time constants associated with sensor electrodes of the first group and with sensor electrodes of the second group.

6. The method of claim 5, wherein a first electrode of the first group has a first time constant substantially larger than a second time constant of a second electrode of the second group, and
   wherein operating the one or more switching elements comprises operating a first switching element coupled with the first electrode.

7. A processing system comprising:
   a sensing module comprising sensing circuitry and configured to:
      drive, onto a first group of a plurality of sensor electrodes, a first capacitive sensing signal having a predefined first sensing frequency;
      acquire, based on the driven first capacitive sensing signal, first baseline capacitive measurements of resulting signals received by a second group of the plurality of sensor electrodes, wherein acquiring first baseline capacitive measurements comprises applying a first demodulation signal having a predefined mixing period defined within a sensing period associated with the first sensing frequency; and
      operate, based on the first demodulation signal, one or more switching elements coupled with one or more sensor electrodes of the first group or the second group, wherein the one or more switching elements are in a conducting state during the mixing period.

8. The processing system of claim 7, further comprising the one or more switching elements.

9. The processing system of claim 7, wherein the sensing module is further configured to:
drive, onto a third group of the plurality of sensor electrodes, a second capacitive sensing signal having a second sensing frequency different from the first sensing frequency; and
acquire, based on the driven second capacitive sensing signal, second baseline capacitive measurements of resulting signals received by a fourth group of the plurality of sensor electrodes, wherein acquiring second baseline capacitive measurements comprises applying a second demodulation signal having the mixing period,
wherein a first average current value for the first baseline capacitive measurements is substantially equal to a second average current value for the second baseline capacitive measurements.

10. The processing system of claim 7, wherein each sensing period comprises a positive sensing half-cycle and a negative sensing half-cycle, wherein the positive sensing half-cycle and the negative sensing half-cycle each have a length corresponding to the mixing period.

11. The processing system of claim 10, wherein the first demodulation signal is a three-level demodulation signal having a positive level, a negative level, and a zero level, and
wherein applying the first demodulation signal and applying the second demodulation signal each comprises:
applying the positive level during the positive sensing half-cycle;
applying the negative level during the negative sensing half-cycle; and
applying the zero level during a predefined period within the sensing period between the positive sensing half-cycle and the negative sensing half-cycle.

12. The processing system of claim 7, wherein a number and a location of the one or more switching elements are selected based on time constants associated with sensor electrodes of the first group and with sensor electrodes of the second group.

13. The processing system of claim 12, wherein a first electrode of the first group has a first time constant substantially larger than a second time constant of a second electrode of the second group, and
wherein operating the one or more switching elements comprises operating a first switching element coupled with the first electrode.

14. An input device comprising:
a plurality of sensor electrodes;
a plurality of switching elements coupled with the plurality of sensor electrodes; and
a processing system configured to:
drive, onto a first group of the plurality of sensor electrodes, a first capacitive sensing signal having a predefined first sensing frequency;
acquire, based on the driven first capacitive sensing signal, first baseline capacitive measurements of resulting signals received by a second group of the plurality of sensor electrodes, wherein acquiring first baseline capacitive measurements comprises applying a first demodulation signal having a predefined mixing period defined within a sensing period associated with the first sensing frequency; and
operate, based on the first demodulation signal, one or more switching elements coupled with one or more sensor electrodes of the first group or the second group, wherein the one or more switching elements are in a conducting state during the mixing period.

15. The input device of claim 14, wherein the processing system comprises the one or more switching elements.

16. The input device of claim 14, wherein the processing system is further configured to:
drive, onto a third group of the plurality of sensor electrodes, a second capacitive sensing signal having a second sensing frequency different from the first sensing frequency; and
acquire, based on the driven second capacitive sensing signal, second baseline capacitive measurements of resulting signals received by a fourth group of the plurality of sensor electrodes, wherein acquiring second baseline capacitive measurements comprises applying a second demodulation signal having the mixing period,
wherein a first average current value for the first baseline capacitive measurements is substantially equal to a second average current value for the second baseline capacitive measurements.

17. The input device of claim 14, wherein each sensing period comprises a positive sensing half-cycle and a negative sensing half-cycle, wherein the positive sensing half-cycle and the negative sensing half-cycle each have a length corresponding to the mixing period.

18. The input device of claim 17, wherein the first demodulation signal is a three-level demodulation signal having a positive level, a negative level, and a zero level, and
wherein applying the first demodulation signal and applying the second demodulation signal each comprises:
applying the positive level during the positive sensing half-cycle;
applying the negative level during the negative sensing half-cycle; and
applying the zero level during a predefined period within the sensing period between the positive sensing half-cycle and the negative sensing half-cycle.

19. The input device of claim 14, wherein a number and a location of the one or more switching elements are selected based on time constants associated with sensor electrodes of the first group and with sensor electrodes of the second group.

20. The input device of claim 19, wherein a first electrode of the first group has a first time constant substantially larger than a second time constant of a second electrode of the second group, and
wherein operating the one or more switching elements comprises operating a first switching element coupled with the first electrode.

* * * * *